United States Patent Office 3,341,558
Patented Sept. 12, 1967

3,341,558
19-NOR-10α-Δ⁴-ANDROSTENE-3,17-DIONE AND PROCESS FOR THE PRODUCTION THEREOF
Eugene Farkas, Indianapolis, Ind., assignor to Eli Lilly and Company, Indianapolis, Ind., a corporation of Indiana
No Drawing. Filed Aug. 13, 1964, Ser. No. 389,484
2 Claims. (Cl. 260—397.3)

This invention relates to a group of steroids having a novel spatial configuration and to methods for their preparation.

One of the problems which has interested steroid chemists over the past few years has been the provision of compounds having the same functional groups as the naturally occurring steroid hormones, but in which the orientation of a substituent at one or more of the fusion carbon atoms is inverted. For example, in testosterone, a naturally occurring male sex hormone, the substituents on the fusion carbon atoms common to the A–B and B–C rings have the 10β, 9α and 8β orientations. Since testosterone has a methyl group at the 10 position, it is not possible to prepare a compound with inverse configuration at 10 in any simple fashion because of the chemical and thermal stability of the methyl group. By contrast, compounds having an inversion of configuration at 9 or at 8 are more readily prepared since the substituents on the fusion carbon atoms in question are hydrogen atoms. In the 19-nor-steroid series, however, there is a hydrogen instead of a methyl group at the 10 position. A 19-nor steroid, therefore, having an inversion of configuration at any of the bridge-head carbons (8, 9, 10) would theoretically be more amenable to synthesis than would be the naturally occurring steroids having a methyl group at C₁₀. In addition, several of the 19-nor compounds themselves having a normal 10β, 9α, 8β orientation for the bridge-head substituents have an extremely high hormonal activity; as for example, 19-norprogesterone, 19-nor-17α-ethinyl testosterone (norlutin) and the like. This high hormonal activity has fostered considerable research in finding methods of preparing 19-nor-3-keto-Δ⁴ steroid hormones having different spatial configurations at the A–B and B–C fusion carbon atoms, although these configurations are inherently less stable than the 10β, 9α, 8β configuration of the naturally occurring 3-keto-Δ⁴ steroid hormones. It is the hope, of course, of those engaged in such research that the hormonal activity of the resulting compounds will be greatly increased to offset any disadvantages as regards stability.

There are four possible orientations for substituents on the carbon atoms at 9 and 10 in a 19-nor-3-keto-Δ⁴ steroid. They are the 10β, 9α; the 10α, 9α; the 10α, 9β; and the 10β, 9β. Of these, as previously mentioned, the 10β, 9α is the naturally occurring configuration and the 10α, 9β orientation, named the retro configuration, has recently been prepared by Rappoldt et al., Helv. Chim. Acta, 79, 795 (1960), Edwards et al., J. Am. Chem. Soc., 85, 3,314 (1963) [see also U.S. Patent 3,138,617, issued June 23, 1964]. The other two configurations for 19-nor steroids have not as yet been described in the literature.

It is an object of this invention to provide a group of 19-nor steroids having different spatial configuration from those of the naturally occurring steroids and also to provide a process which can be used to prepare such "unnatural" steroids.

In fulfillment of the above and other objects, this invention provides compounds represented by the formula

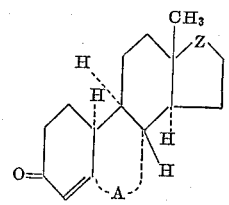

wherein A is a member of the group consisting of —CH₂—CH₂— and —CH=CH—; and Z is a member of the group consisting of

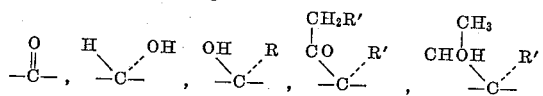

wherein R is a member of the group consisting of hydrogen, lower aliphatic and halo-substituted lower aliphatic; and R' is a member of the group consisting of hydrogen, hydroxy and acyloxy. These compounds, containing as they do the 10α, 9α, 8β configuration, will be referred to hereinafter as "19-nor-10α" steroids. When R is a lower aliphatic group, it can contain from one to three carbon atoms and may also have present in the carbon chain an ethylenic or acetylenic grouping. Illustrative radicals coming within the scope of the term R include methyl, ethyl, isopropyl, vinyl, ethynyl, allyl, proparagyl and the like. When R is a halo-substituted lower aliphatic group, the halogen substituents can be fluoro, chloro, bromo, or iodo and these substituents can be present in any of the groups listed above to illustrate the term, "lower aliphatic." Examples of such groups include chloroethynyl, bromoethyl, chloroallyl, dichloroethyl, iodomethyl and the like.

In the above formulas, when R' represents an acyloxy group, the acyl portion of the radical can contain either an aliphatic or an aromatic group, thus yielding acyloxy groups such as acetoxy, propionoxy, butyroxy, benzoxy, phenylacetoxy, naphthoxy, adamantanecarboxy, cyclopentylpropionoxy and the like. In general, the acyloxy groups which R can represent include all the standard ester groupings, and these groupings can in turn contain substituents such as alkyl, nitro, chloro, alkoxy, etc.

In addition to the steroids specifically represented by the above formulas, this invention also includes substituted derivatives of those compounds, which derivatives are all well-known equivalents of the steroids specifically represented, including such obvious modifications as 6α-fluoro, 6α-methyl, 16α-hydroxy, 2α-chloro and the like, as well as compounds containing double bonds at positions in the steroid ring other than 4(5) or 6(7). In addition, this invention includes within its scope those compounds containing oxygen functions at C₁₁, which series of compounds are generally known as the glucocorticoids and mineralocorticoids.

The compounds of this invention are prepared by a novel process, which process constitutes a second aspect of this invention. According to this novel process, a 3-keto-Δ⁴⁽⁵⁾-19-nor-10α-steroid is prepared by selectively hydrogenating the Δ⁹⁽¹⁰⁾ double bond of a Δ⁴,⁹⁽¹⁰⁾ steroid in the presence of a noble metal catalyst, at a hydrogen pressure of three atmospheres or less, and at a temperature below about 50° C. In carrying out this process, a $\Delta^{4,9(10)}$ steroid, as provided by the procedure of U.S. Patent 3,086,027 (April 16, 1963), is hydrogenated in a standard hydrogenation apparatus using a noble metal catalyst, most conveniently at atmospheric pressure and at room temperatures, though temperatures in the range 0–50° C. are fully operative. In carrying out the hydrogenation, it is preferred to employ a noble metal catalyst which is not too active as a hydrogenation catalyst, as for example, palladium supported on an inert carrier. If a more active noble metal catalyst, such as platinum black or ruthenium oxide, is employed, it is necessary to partially de-activate this catalyst, according to known methods of the art, so as to reduce the amount and number of by-products formed in the hydrogenation, such by-products particularly including the saturated 5α, 10α, 9α, 8β steroid. Alternatively, it is possible to use only one equivalent of hydrogen by diluting the hydrogen with an inert gas such as nitrogen and, in this way, employ a more active catalyst. In general, however, it is a more practical and more economical procedure to use a less active catalyst consisting of a noble metal supported on an inert carrier. Among the noble metals which can be thus employed are all of those of the transition series, including palladium, platinum, iridium, rhodium, ruthenium, and osmium. Among the carriers which can be employed are such standard carriers as barium sulfate, alumina, carbon, and the like. The hydrogenation is usually carried out in an inert solvent, preferably one of the lower aliphatic alcohols, since the oxygenated steroids represented by the above formula are more soluble in these polar solvents than they are in the aliphatic hydrocarbons. The reaction is most conveniently carried out at atmospheric pressure. It will also be understood by those versed in the art that somewhat higher pressures, up to two or three atmospheres, can be employed without serious affecting the yield of the desired 10α compound. Compounds which can undergo this selective hydrogenation of the more hindered of the two double bonds originally present in a 3-keto-$\Delta^{4,9(10)}$-19-nor steroid can be represented by the following formula:

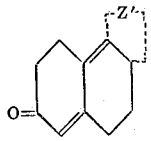

wherein Z′ represents the C and D rings of a steroid molecule together with any substituents which they may bear.

Compounds coming within the scope of this invention, and preparable by the process outlined above, have interesting physiological activities. For example, 19-nor-10α-testosterone is a potent gonadotrophin inhibitor substantially without any androgenicity as compared to the closely related compound, 19-nor-testosterone, which is both a gonadotrophin inhibitor and an androgen.

The compounds provided by this invention, having as they do a $\Delta^4$ double bond, contain an allylic system of which the tertiary hydrogen at the 10 position is one member. This hydrogen is quite labile and its lability has proved extremely useful in determining the structure of the compounds prepared by the above process since treatment of a $\Delta^4$-19-nor-10α steroid with base or acid readily yields the corresponding $\Delta^4$-10β compound which compound corresponds to the naturally occurring steroids and represents the most stable configuration at the 9 and 10 positions.

The lability of the 10α-hydrogen makes the compounds of this invention difficult to work with since the types of reactions which they may undergo are greatly restricted by the necessity of avoiding conditions favoring epimerization during the reaction and work-up. On the other hand, the 10α compounds of this invention, if carefully purified, are stable indefinitely in the absence of materials which might catalyze the aforesaid epimerization.

Certain other compounds coming within the scope of this invention can be prepared from a prior synthesized steroid having the 10-iso configuration by using reaction conditions which avoid catalysts causing epimerization. For example, the $\Delta^{4,6}$ compound can be prepared from 19-nor-10α-testosterone by a neutral oxidation with dichlorodicyanobenzoquinone or similar material. Similarly, 19-nor-10α-testosterone can be oxidized to yield the corresponding diketone by employing a relatively neutral oxidizing agent such as chromium dioxide in pyridine. Other similar transformations will readily suggest themselves to those skilled in the art.

This invention is further illustrated by the following specific examples:

*Example 1.—19-nor-10α-testosterone*

1 g. of 19-nor-4,9(10)-androstadien-17β-ol-3-one was dissolved in 1 ml. of ethanol and the resulting solution was hydrogenated in a micro hyrogenation apparatus at atmospheric pressure using 0.42 g. of 5 percent palladium-on-carbon as the hydrogenation catalyst. After about 15 minutes, one equivalent of hydrogen had been absorbed and the hydrogenation mixture was removed from the apparatus and filtered to remove the catalyst. The filtrate was evaporated to dryness in vacuo, leaving as a residue 19-nor-10α-testosterone. The residue was dissolved in a 1:1 benzene-hexane solvent mixture and chromatographed over 60 g. of neutral alumina (Grade III), employing the same solvent mixture as the eluant. Eluate fractions of 60 ml. each were collected. After 7 fractions had been obtained, the eluting solvent was changed to a 2:1 benzene-hexane solvent mixture and 70 further fractions collected. Fractions 38 to 77, on evaporation to dryness, were found to contain about 0.045 g. of 19-nor-10α-testosterone melting in the range 167–170° C. Vapor phase chromatography, optical rotary dispersion, and ultraviolet spectrum studies on the compound thus obtained confirmed the fact that it had the 9α, 10α configuration.

*Analysis.*—Calc.: C, 78.79; H, 9.55. Found: C, 78.97; H, 9.33. Optical rotation: $[\alpha]_d = -191°$. Ultraviolet absorption: $\lambda$ max.=242.5; $\epsilon$=15,650.

The above hydrogenation procedure was repeated using a 5 percent palladium-on-alumina catalyst. 0.16 g. of 19-nor-10α-testosterone melting in the range 167–170° C. was obtained after recrystallization of the crude product from ether.

The above procedure was repeated using 5 percent palladium-on-barium sulfate as the catalyst with substantially the same yield of 19-nor-10α-testosterone melting in the range 167–170° C.

*Example 2.—17α-methyl-19-nor-10α-4-androsten-17β-ol-3-one*

Following the procedure of Exampple 1, 1 g. of 17α-methyl-19-nor-4,9(10)-androstadien-17β-ol-3-one in ethanol solution was hydrogenated at atmospheric pressure and ambient temperature, using 5 percent palladium-on-barium sulfate as the catalyst. After one equivalent of hydrogen had been absorbed, the hydrogenation mixture was filtered to remove the catalyst, and the filtrate evaporated to dryness in vacuo. The residue, containing 17α-methyl-19-nor-10α-4-androsten-17β-ol-3-one formed in the above hydrogenation, was dissolved in a 3:1 benzene-hexane mixture and chromatographed over a 30 g. neutral alumina (Grade III). Using the above solvent as the eluant, sixty-one 60 ml. fractions were obtained. Each fraction was evaporated to dryness in vacuo. Fractions 41 through 53 were found to contain 17α-methyl-19-nor-10α-4-androsten-17β-ol-3-one, as indicated by ultraviolet spectroscopy and confirmed by vapor phase chromatography.

*Example 3.—19-nor-10α-4,6-androstadien-17β-ol-3-one*

0.02 g. of 19-nor-10α-testosterone, as prepared in Example 1, was dissolved in 4 ml. of dioxane, 17 mg. of dichloro-dicyanobenzoquinone were added to the solution. The resulting mixture was heated to refluxing temperature for about 120 hours, and was then cooled and filtered. The filtrate was poured into a saturated sodium chloride solution chilled to about 0° C. by the addition of ice. The aqueous mixture was next extracted with methylene dichloride. The methylene dichloride extract was separated and was washed successively with a saturated sodium bicarbonate solution and a saturated sodium chloride solution. The organic layer was dried and slurried with alumina to remove any color. Evaporation of the organic layer to dryness in vacuo yielded a residue containing about 20 percent of 19-nor-10α-4,6-androstadien-17β-ol-3-one as determined by ultraviolet absorption spectrum. 19-Nor-10α-4,6-androstadien-17β-ol-3-one thus prepared can be obtained in a pure state by chromatography over alumina or similar material.

*Example 4.—19-nor-10α-4-androstene-3,17-dione*

0.1 g. of chromium dioxide was dissolved in 1 ml. of pyridine. The resulting solution was cooled to about 0° C. A solution comprising 0.1 g. of 19-nor-10α-testosterone dissolved in 2 ml. of pyridine was added to the oxidizing solution. The reaction mixture was allowed to stand in an ice bath for about an hour and then at room temperature overnight. The resulting dark mixture was poured into a mixture containing 100 ml. of a saturated aqueous sodium chloride solution chilled to about 0° C. by the addition of ice. The aqueous layer was extracted four times with 100 ml. portions of ether. The ether extracts were combined and washed successively with four 100 ml. portions of 5 percent aqueous hydrochloric acid, 100 ml. of a saturated bicarbonate solution, and 100 ml. of a saturated sodium chloride solution. The ether solution was dried and the ether removed therefrom by evaporation in vacuo. Recrystallization of the residue from ether yielded glistening white needles of 19-nor-10α-4-androstene-3,17-dione melting at about 160–161° C. Infra-red spectrum of the compound showed the presence of a new ketone band and the loss of the hydroxyl band compared with the spectrum of 19-nortestosterone, thus confirming the expected structure.

*Example 5.—Preparation of esters*

Acyl esters of the 17-hydroxy compounds of this invention can be prepared by reacting the 17-hydroxy steroid with an acid anhydride in pyridine solution. 19-Nor-10α-testosterone acetate, prepared by reacting the parent alcohol with acetic anhydride in pyridine solution, melted at about 140–141° C. after recrystallization from ether.

Other esters, as for example the benzoate, the 2,4-nitrobenzoate, the propionate, the phenylacetate, the nicotinate and the like, can be prepared by using the corresponding anhydride or a mixed anhydride of the desired acid and trifluoracetic acid in place of acetic anhydride in the above example.

I claim:
1. 19-Nor-10α-4-androstene-3,17-dione.
2. The process of preparing a 19-nor-10α steroid which comprises hydrogenating a 3-keto-$\Delta^{4,9(10)}$-19-nor steroid in the presence of a noble metal catalyst at a hydrogen pressure below about 3 atmospheres and at a temperature below about 50° C.

References Cited
UNITED STATES PATENTS

| | | | |
|---|---|---|---|
| 3,167,547 | 1/1965 | Cross | 260—239.55 |
| 3,198,792 | 8/1965 | Reerink et al. | 260—239.55 |
| 3,207,753 | 9/1965 | Bowers et al. | 260—239.55 |

ELBERT L. ROBERTS, *Primary Examiner.*
LEWIS GOTTS, *Examiner.*